United States Patent

Bronfin et al.

[15] 3,701,045
[45] Oct. 24, 1972

[54] CHEMICAL MIXING LASER

[72] Inventors: Barry Robert Bronfin; Wayne Gregory Burwell, both of Wethersfield; Richard August Meinzer, Glastonbury, all of Conn.

[73] Assignee: United Aircraft Corporation, East Hartford, Conn.

[22] Filed: Oct. 23, 1970

[21] Appl. No.: 83,432

[52] U.S. Cl. ................................. 331/94.5, 330/4.3
[51] Int. Cl. ........................... H01s 3/22, H01s 3/09
[58] Field of Search ................. 331/94.5; 330/4.3

[56] References Cited

UNITED STATES PATENTS 3,560,876   2/1971   Airey ..................... 331/94.5
3,575,669   4/1971   Haeff ..................... 331/94.5

OTHER PUBLICATIONS

Spencer et al., Int' l J. Of Chemical Kinetics, Vol. 1, September 1969, pp. 493– 494, Natl. Lib. of Congress,
Spencer et al., Applied Physics Letters, Vol. 16, No. 10, 15 May 1970, pp. 384– 386. QC1A745.

Primary Examiner—Ronald L. Wibert
Assistant Examiner—R. J. Webster
Attorney—Melvin Pearson Williams

[57] ABSTRACT

Primary reactants in nonstoichiometric proportions interact chemically in a reaction chamber to produce a high temperature, high pressure gas containing a substantial percentage of free atoms. Aerodynamic expansion of the gas effluent from the reaction chamber preserves the free atoms in an unrecombined condition. A secondary reactant is admixed with the main gas stream after the expansion process and reacts chemically with the free atoms to produce a gas which is in a vibrational state population inversion condition and which lases in an appropriate optical cavity.

20 Claims, 3 Drawing Figures

EQUILIBRIUM TEMPERATURE AND PRODUCT COMPOSITION FOR REACTION OF LIQUID $H_2$ WITH LIQUID $F_2$

OPTICAL POWER VERSUS DISTANCE FROM POINT OF SECONDARY GAS INJECTION FOR CONSTANT MOLE FLOW THROUGH COMBUSTOR

CHEMICAL MIXING LASER

BACKGROUND OF THE INVENTION

1. Field of Invention

This invention relates to gas lasers and more particularly to chemical gas lasers.

2. Description of the Prior Art

Chemical laser systems have been reported since about 1965. The initial technical reports describe conceptual lasers systems in which the large amount of power potentially available from chemical lasers is immediately apparent; further the relatively simple and lightweight nature inherent in a laser pumped with energy from a chemical reaction rather than an electrical source makes chemical powered systems attractive.

Generally speaking, the physical characteristics of chemical laser reactants and the physical dimensions of the apparatus designed to take advantage of such characteristics are critical. As a result, the first chemical systems made operable were intermittent output (pulsed) lasers; a limited amount of reactant (sufficient to sustain pulsed lasing) could be provided but a large supply of appropriate reactants and a system capable of providing a continuous wave chemical laser were more difficult to produce.

The more successful early chemical lasers were of the gas dynamic type, the most notable one being the nitrogen carbon dioxide system. In this system, appropriate reactants are combusted, producing carbon dioxide and releasing energy; nitrogen gas molecules are mixed with the products of combustion and a large population of vibrationally excited nitrogen is produced at thermal equilibrium. All of the gases are cooled in an aerodynamic expansion process, but due to the relatively long relaxation time of the vibrationally excited states in nitrogen, the energy stored within the states is retained as nonequilibrium vibrational excitation. This retained vibrational energy is subsequently transferred to the cool carbon dioxide molecules by collision processes in an appropriate flow channel located downstream of the expansion nozzle. A population inversion is thereby created in the vibrational states of the carbon dioxide and the carbon dioxide is then induced to release some of the transferred energy as stimulated emission in an optical cavity.

The indicated gas dynamic system is limited in the amount of power which can be removed as laser energy because the proportions of both carbon dioxide and nitrogen in the lasing cavity must be maintained within specific ranges; these ranges in turn limit the amount of energy which is released in the carbon combustion process and, therefore, determine a maximum enthalpy for the total effluent flowing through the laser system.

A well known modification to the gas dynamic lasing system is the gas dynamic mixing laser which is similar in operation. In the mixing laser, nitrogen is heated (usually by electrical means), expanded aerodynamically, and mixed with cold carbon dioxide; a population inversion is created in the carbon dioxide and laser power is extracted in an optical cavity.

The gas dynamic mixing laser arrangement can be energized by electrical sources and does not suffer the combustion limitation experienced by the gas dynamic laser; however, the mixing laser does have the undesirable requirements of, 1) an external energy source and 2) a mechanism for temporarily storing the energy added (in, for example, nitrogen) to the gases and transferring this energy to the lasing species of gas.

By allowing the appropriate elements and compounds to chemically react, various gases capable of lasing can be produced; systems to date (including the hydrogen halides and carbon monoxide) have demonstrated that several molecules formed by chemical reaction can be made to lase in an appropriate optical cavity. Further, chemical reactions have been shown to produce the hydroxyl radical in a vibrational state population inverted condition. Hydrogen molecules and fluorine atoms, or hydrogen atoms and fluorine molecules, for example, react chemically to produce directly vibrationally excited hydrogen fluoride molecules. In an appropriate system, the hydrogen fluoride produced in this manner can be induced to release energy as a laser beam. While chemical gas lasers have been demonstrated, the principal problems accounted to date are providing the reactants required and achieving a sufficient energy release to provide a large population inversion in the lasing gas after the reactants have been mixed; devising a structural configuration to provide continuous laser emission has also been difficult to accomplish.

As used herein, freezing (a term commonly used in the gas laser art) describes an aerodynamic gas process. Freezing occurs as gases undergo a rapid expansion to relatively low temperature and pressure; during the expansion, flow conditions are such that the reactive gases are unaltered chemically due to the slowness of the chemical reaction kinetics.

SUMMARY OF THE INVENTION

A principal object of this invention is to convert chemical energy into high power laser energy.

In accordance with the present invention free atoms are produced in an atomic state by chemical reaction and the atoms are further reacted to form a lasable gas. According to the present invention, two primary reactants interact exothermically in a reaction chamber to produce a high temperature, high pressure gas mixture containing free atoms; the gaseous effluent which is driven from the reaction chamber by the high pressure therein, undergoes rapid aerodynamic expansion to freeze the energy states of the free atoms; a secondary reactant is admixed to the gas mixture and a secondary reaction occurs with the release of some additional energy and the formation of an inverted population of vibrationally excited gas which lases in an optical cavity.

In accordance with one embodiment of the invention, a diluent gas which does not interact chemically, is added to the reaction chamber to limit the subsequent temperature rise of the gases due to the second reaction; the diluent addition also 1) prohibits the formation of excessive aerodynamic disturbances in or upstream of the optical cavity, 2) extends the lifetime of the free atoms formed and 3) subsequently extends the lifetime of the population inverted secondary reaction product. Diluent gas can also be added simultaneously with the secondary reactant; alternatively, diluent gas can be added in addition to or in place of the addition to the reaction chamber; diluents are advantageous but, in principle, not essential to the operation of the invention.

In accordance with some embodiments of the invention, an isotope of one of the primary reactants is admixed as the secondary reactant rather than an additional amount of one of the primary reactants. For example, primary reactants hydrogen and fluorine have been reacted to produce an excess of free fluorine atoms, and hydrogen has been admixed as the secondary reactant to produce laser energy from hydrogen fluoride. However, if deuterium is used as the secondary reactant, 1) increased laser output power is observed and 2) the wavelength of the laser output beam is shifted from the hydrogen fluoride lines to that corresponding to deuterium fluoride; this shift precludes both optical absorption by and vibrational energy transfer to the effluent gases from the reaction chamber.

An advantage of this invention is that no external power supply is required for gas energization; most of the added enthalpy contained in the gas is provided by chemical reaction processes. In addition, no intermediate gas molecules are needed to store and transfer the reaction energy to the lasing molecules; the inverted population of vibrational energy levels which supports laser action is produced directly from chemical reaction. Further, a laser having relatively high specific power (kilowatts per pound per second of reactant flow) is achieved since a very large fraction of the chemical energy can be converted into laser energy.

This invention is characterized by a high pressure reaction of flammable gases which produces 1) a large energy release and 2) the formation of free atoms which are captured for use by an aerodynamic expansion to a condition of lower temperature and pressure. This invention is further characterized by a low pressure optical cavity which provides sufficiently long lifetimes for vibrationally excited gas molecules to allow them to emit by stimulated emission.

A feature of this invention is the continuous flow of the gases through an optical cavity to provide continuous laser output and to avoid absorption of the laser emission by spent molecules. An additional feature of one embodiment of this invention is the use of a diluent gas in either or both of the reaction chamber and the mixing region for the purposes of 1) limiting the temperature rise of the gases due to the chemical energy release, 2) prohibiting the formation of excessive aerodynamic disturbances in or upstream of the optical cavity, 3) extending the lifetime of the primary atomic product and, subsequently, the inverted secondary reactant product species.

The foregoing and other objects, features and advantages of the present invention will become more apparent in the light of the following detailed description of the preferred embodiment thereof as illustrated in the accompanying drawings.

DESCRIPTION OF THE PREFERRED EMBODIMENT

Figure 1:
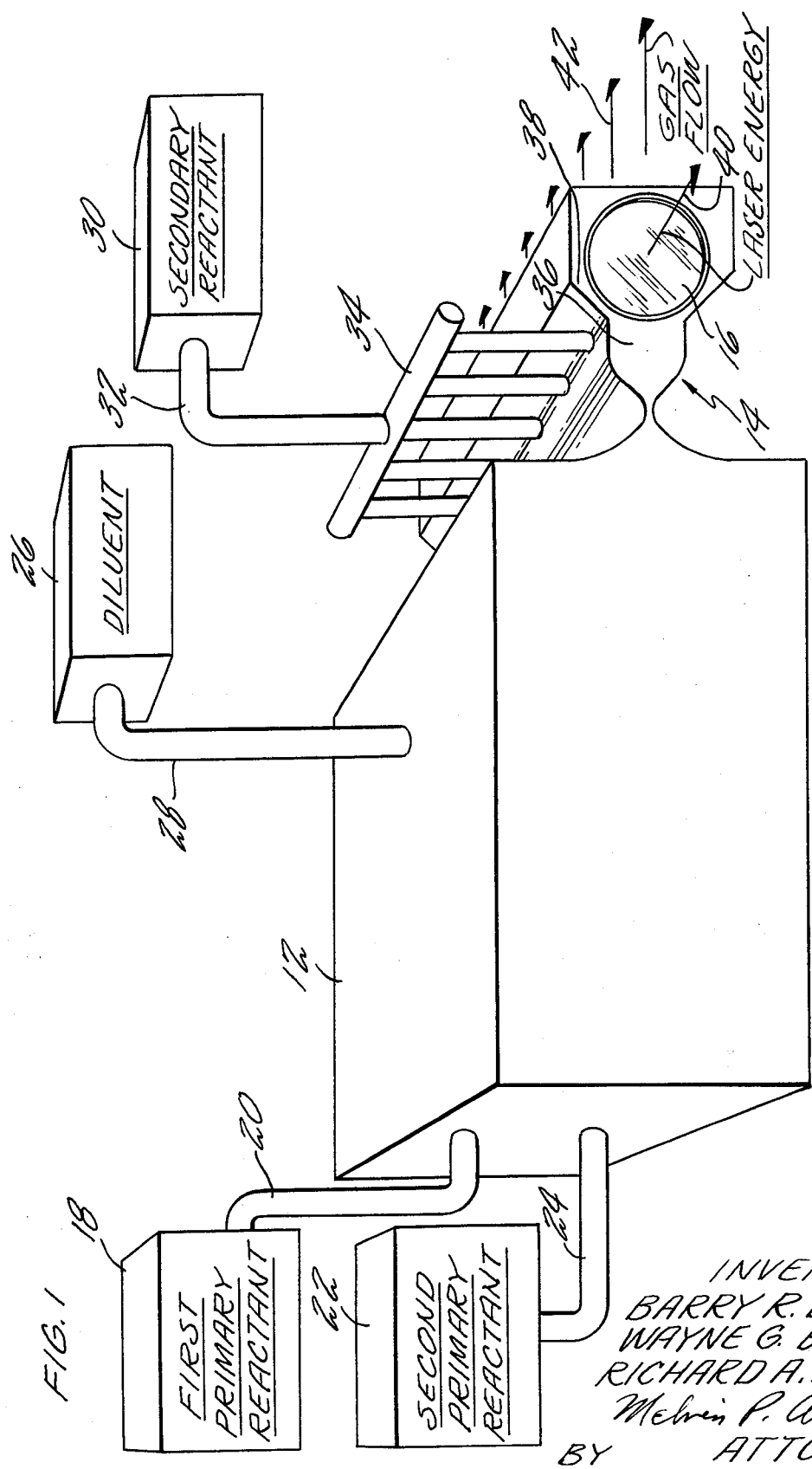
FIG. 1 is a perspective schematic illustration of one embodiment of the present invention.

Referring to FIG. 1, a reaction chamber 12 is arranged adjacent to a convergent/divergent nozzle 14 and upstream of an optical cavity 16. During operation, a first primary reactant 18 which communicates with the reaction chamber through an appropriate passageway such as pipe 20 and a second primary reactant 22 which communicates with the reaction chamber 12 through an appropriate passageway such as a pipe 24 chemically interact in the reaction chamber to form high pressure gaseous reaction products at high temperature conditions. A diluent gas 26 is injected into the reaction chamber through a pipe 28. The gases in the reaction chamber are then rapidly expanded across the nozzle 14 to a condition of lower pressure, density and translational temperature. The nozzle is designed to inhibit free atom recombination; rapid aerodynamic expansion to inhibit free atom recombination is that exemplified by Bray, K.N.C., Journal of Fluid Mechanics, Volume 6, No. 1, 1959.

At a location between the optical cavity and the throat of the nozzle 14, a secondary reactant 30 which communicates with the nozzle through an appropriate passageway such as a pipe 32 and an interconnecting manifold 34 is admixed in a secondary reaction region or a mixing region 36 which is internal to the nozzle. In the mixing region 36, the secondary reactant chemically reacts with the main gas stream, raising the enthalpy of the flowing gases and also forming a vibrationally excited species of gas. The pressure and temperature of the main gas stream are reduced by the continued expansion across an expansion section 38 of the nozzle 14. When the vibrationally excited gas reaches the optical cavity 16, stimulated emission of optical energy occurs and laser energy 40 is removed from the optical cavity. A gas flow 42 is then exhausted from the system.

Figure 2:
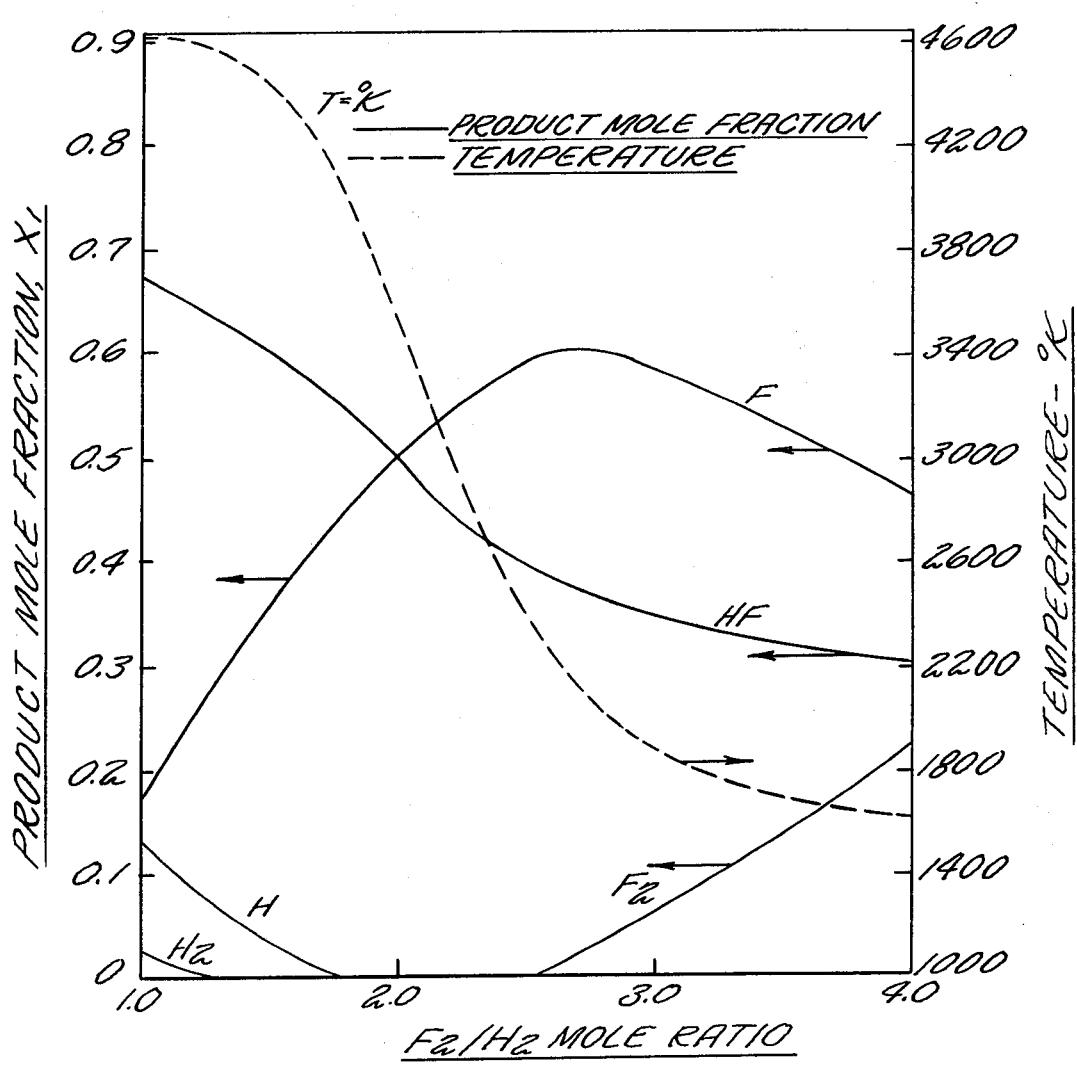
FIG. 2 is a graph illustrating the equilibrium temperature and reactant composition for the reaction of an exemplary chemical system comprising liquid hydrogen with liquid fluorine.

In a preferred embodiment, hydrogen and fluorine primary reactants undergo a nonstoichiometric chemical reaction in the reaction chamber with helium diluent added to produce a fluorine atom rich gas. The temperature of the gas effluent from the reaction chamber (which comprises hydrogen fluoride, fluorine atoms and the diluent gas) is in the range of 2,000° to 3,000°F. The workable fluorine-to-hydrogen ratio is in the range of 1 to 5:1 although the preferred range is 2 to 3:1 as can be seen from FIG. 2. As the fluorine hydrogen ratio gets higher than about 3:1 the fluorine atom content of the effluent from the reaction chamber decreases due to the excessive dilution and cooling of the reaction products by the excessive fluorine (see FIG. 2); should the fluorine hydrogen ratio go below about 2:1 the fluorine atom content of the effluent gases again decreases, due to the restricted amount of excess fluorine added.

At the preferred operating condition, the gas temperature resulting from the chemical reaction is sufficiently high to cause essentially all of the excess fluorine molecules supplied to dissociate into fluorine atoms, although, as aerodynamic expansion proceeds there is a tendency for the fluorine atoms to recombine to fluorine molecules, releasing the heat of formation in the process.

The helium diluent injected into the reaction chamber typically comprises 30 to 60 percent by volume of a total gas composition for effluent which leaves the reaction chamber; the diluent has a cooling effect on the reactant gases.

The total gas mixture which includes hydrogen fluoride, fluorine and helium is then cooled to approximately 100°F by very rapidly expanding the gas mixture across the aerodynamic nozzle 14. The free fluorine atoms have a relatively long chemical recombination time at these conditions (approximately one millisecond) and thus become frozen in the atomic or free atom condition.

Deuterium is added as the secondary reactant. The ratio of deuterium to hydrogen is approximately four and this ratio provides substantially complete chemical reaction of all the available fluorine atoms with the deuterium. As the fluorine atoms react with the deuterium, an immediate population inversion in the newly formed excited deuterium fluoride occurs since few of these molecules are created in the ground state level. Reaction of the secondary reactant with the free fluorine atoms produces additional heat and a pressure rise, neither of which assist the laser operation; additional expansion is therefore provided in the expansion section 38 of the nozzle 14 to further reduce the pressure of the gas mixture. Since the diluent added in the reaction chamber has been expanded across the aerodynamic nozzle together with the fluorine atoms, it is at a relatively low temperature and it too is available to absorb heat from the secondary reaction process.

Figure 3:
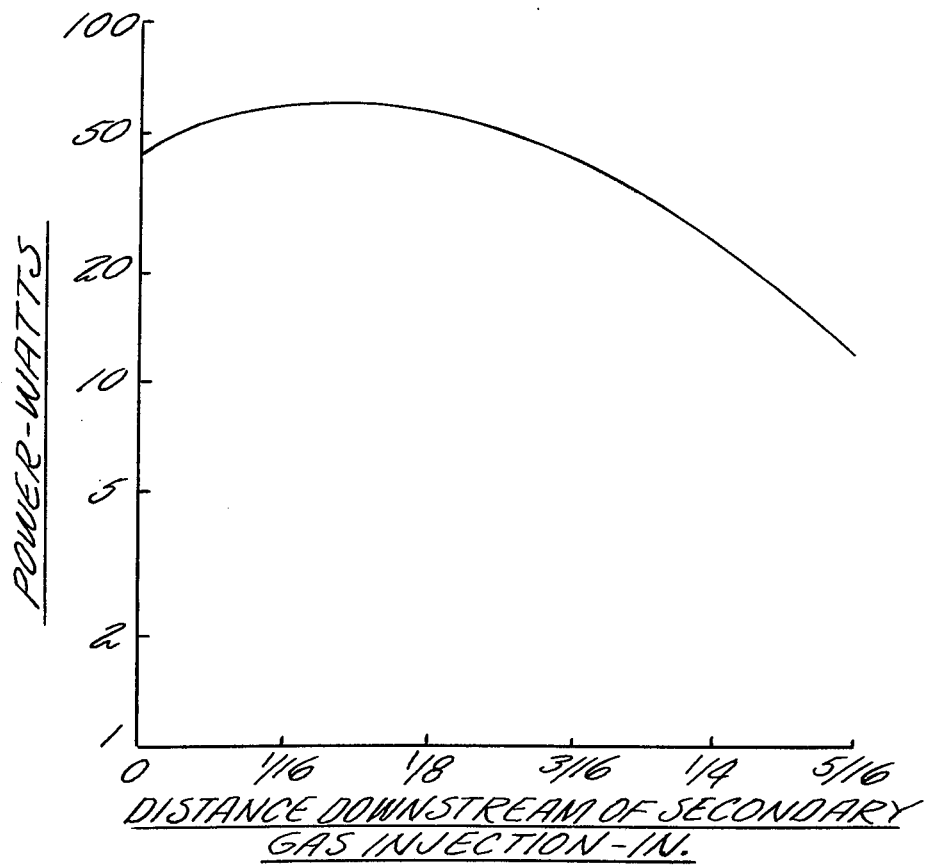
FIG. 3 is a graph illustrating optical cavity at various points downstream of a secondary admixing point.

The excited deuterium fluoride molecules are passed through the optical cavity 16 immediately upon or after formation; since the deuterium fluoride has a very short lifetime (approximately 50 microseconds) in the excited state, the optical cavity design is critical and necessarily very close physically to the secondary reaction region. The effect on system power of optical cavity distance downstream of the secondary injection point is shown in FIG. 3 for the case of hydrogen and fluorine. Although the hydrogen fluoride laser system operated with hydrogen and fluorine as the primary reactants with a fluorine atom rich effluent from the reaction chamber is the principal system which has been investigated, other chemical systems using carbon, sulfur or carbon disulfide for example, in place of the hydrogen have also been found workable; still other chemical systems with totally different combinations of reactants were also found workable. From a knowledge of the thermochemical physical constants of molecules and atomic species of interest and utilizing the approach of *Kinetics Equilibria and Performance of High Temperature Systems*; Proceedings of the First Conference; G.S. Bahn and E.E. Zukoski, Editors, pp. 105–114, Butterworth Inc., Washington, 1960; Machine Computation of Chemical Equilibria in Reacting Systems, D.C. McMahon and R. Roback, the selection of such reagents which would lead to the desired free atoms can be established.

When hydrogen and fluorine are reacted as the primary reactants, an isotope of hydrogen, preferably deuterium, is added as the secondary reactant and a deuterium fluoride laser is produced as has been mentioned previously as a preferred embodiment. When an isotopic substitution is made for the secondary reactant, a population inversion is created immediately as a result of the secondary reaction and a greater laser power can be extracted from the vibrationally excited gas. The hydrogen-fluorine system has been operated with and without isotopic substitution; the power extracted when hydrogen and fluorine are used as primary reactants and deuterium is the secondary reactant is up to five hundred times as great as that observed when hydrogen and fluorine are used as primary reactants and hydrogen is used as the secondary reactant. In addition to the large difference in potential output power, isotopic substitution for the secondary reactant changes the wavelength of the laser output; when hydrogen is the secondary reactant a hydrogen fluoride laser is produced; when deuterium is used as a secondary reactant a deuterium fluoride laser is produced. In an analogous system, deuterium and fluorine are reacted as the primary reactants and hydrogen is added as the secondary reactant producing a high power hydrogen fluoride laser system.

FIG. 1 shows the expansion section 38 of the nozzle 14 downstream of the mixing region 30. This expansion section is generally but not always required depending upon the lasing conditions in the optical cavity 40. For example, the gas pressure in the optical cavity, as dictated by the optical characteristics of a laser system, is typically about one hundred Torr pressure. If the secondary reactant can be reacted with the main gas stream passing through the nozzle to produce an appropriate species in an inverted population condition at a low enough pressure, further expansion as provided by the section 38 is not required. As a practical matter, expansion after the second reactant injection is generally needed to satisfy the optical cavity pressure requirements. Although a hydrogen-rich reaction is feasible, a fluorine-rich reaction is preferred since more free atoms can be produced at a lower reaction chamber temperature when excess fluorine is being produced. For example, without primary reactant dilution, sixty percent of the reaction products are atomic fluorine with a corresponding combustion temperature of 4,000°F in a fluorine-rich reaction; alternatively, only 20 percent of the reaction products is atomic hydrogen with a corresponding reaction products temperature of 7,500°F in a hydrogen-rich reaction.

The diluent gas used is preferably helium, although other gases such as sulfur hexafluoride, nitrogen, argon and other have been used with small degradation in overall system performance. In the hydrogen fluorine system, for example, sulfur hexafluoride has been injected into the reaction chamber in an amount sufficient to constitute fifteen to thirty molar percent of the gases in the reaction chamber with good results. The diluent provides control of the thermodynamic, aerodynamic and kinetic processes occurring throughout the laser and it can be added to either the reaction chamber, the secondary reaction region or both regions. For conditions of maximum power output, all diluent is added to the reaction chamber; however, diluent injection into the secondary reaction region has been found to provide improved penetration of the gas stream by the secondary reactant resulting in improved overall reaction rates and lower consumption of secondary reactant. Therefore, if maximum economy of the secondary reactant is preferred over maximum output power from the system, diluent is injected with the secondary reactant under some conditions. As a still further variation, a lasing system can be operated with no diluent as is the case when a simple lightweight laser is the dominant design criterion rather than maximum power.

Carbon dioxide is another gas which can be made to lase by the same technique as the described hydrogen fluoride system. In the carbon dioxide system, a combination of cyanogen and ozone in a molar ratio of 1:1.5 can be reacted in a reaction chamber to produce a hot source of high pressure gas containing, theoretically, 19 molar percent of free oxygen atoms. These atoms are then mixed with a suitable secondary reactant such as carbon disulfide or carbon suboxide to form carbon monoxide in a vibrational state population inversion. Alternatively, oxygen difluoride and lithium in the molar ratio of 0.55:1 can be reacted to provide a gas mixture containing 22 mole percent of free oxygen for subsequent secondary reaction. The excited carbon monoxide is passed through an appropriate optical cavity for laser energy production.

The hydroxyl radical chemical laser is another alternative to the described hydrogen fluoride chemical mixing laser. The hydroxyl system relies on the reaction of hydrogen and fluorine in a 1.4:1 molar ratio to produce a high pressure gas containing eighteen molar percent free hydrogen atoms. The free hydrogen is then reacted with ozone to produce vibrationally excited hydroxyl atoms and hydrogen. The excited hydroxyl radicals are passed through an appropriate optical cavity for the production of laser energy. The hydroxyl system has the disadvantage of requiring a very high combustion chamber temperature in order to produce the free hydrogen atoms.

The following is a summarization of those combinations of gases which have been studied and can be made to lase by the chemical mixing laser methods of the present invention. In the generation of free fluorine atoms for example, hydrocarbons in general are considered readily substitutable for hydrogen as a primary reactant although the yield of free fluorine would be lower in the case of hydrocarbons due to the less energetic reaction which would occur; an attractive extension of the indicated listing would include solid propellant reactants.

| Primary Reactants | | Free | Secondary | Lasing |
|---|---|---|---|---|
| First | Second | Atoms | Reactants | Species |
| $D_2$ | | | | |
| $S$ | | | | |
| $CS_2$ | $F_2$ | F | $H_2$ | HF |
| $C_2N_2$ | | | | |
| $H_2$ | | | | |
| $C$ | | | | |
| $S$ | | | | |
| $CS_2$ | $F_2$ | F | $D_2$ | DF |
| $C_2N_2$ | | | | |
| $H_2$ | | | | |
| $C$ | | | | |
| $H_2$ | $F_2$ | H | $SF_6$ | HF |
| $N_2H_4$ | $ClF_3$ | | $CF_4$ | |
| $NH_3$ | $ClF_5$ | | $F_2$ | |
| $D_2$ | $F_2$ | D | $SF_6$ | DF |
| | $ClF_3$ | | $CF_4$ | |
| | $ClF_5$ | | $F_2$ | |
| $H_2$ | $F_2$ | H | $Cl_2$ | HCl |
| $N_2H_4$ | $ClF_3$ | | | |
| $NH_3$ | $ClF_5$ | | | |
| $D_2$ | $F_2$ | D | $Cl_2$ | DCl |
| | $ClF_3$ | | | |
| | $ClF_5$ | | | |
| $H_2$ | $F_2$ | H | $Br_2$ | HBr |
| $N_2H_4$ | $ClF_3$ | | | |
| $NH_3$ | $ClF_5$ | | | |
| $D_2$ | $F_2$ | D | $Br_2$ | DBr |
| | $ClF_3$ | | | |
| | $ClF_5$ | | | |
| $H_2$ | $F_2+Cl_2$ | Cl | $HBr$ | HCl |
| | $ClF_3$ | | HI | |
| | $ClF_5$ | | | |
| $H_2$ | $F_2+Cl_2$ | Br | HI | HBr |
| | $BrF_3$ | | | |
| | $BrF_5$ | | | |
| $H_2$ | $F_2$ | H | $I_2$ | HI |
| $N_2H_4$ | $ClF_3$ | | | |
| $NH_3$ | $ClF_5$ | | | |
| $D_2$ | $F_2$ | D | $I_2$ | DI |
| | $ClF_3$ | | | |
| | $ClF_5$ | | | |
| $C_2N_2$ | $P_2$ | O | $CS_2$ | CO |
| Li | $O_3$ | | $C_3O_2$ | |
| $CS_2$ | $OF_2$ | | | |
| $C$ | | | | |
| $H_2$ | $F_2$ | H | $O_3$ | OH |

Although the invention has been shown and described with respect to preferred embodiments thereof, it should be understood to those skilled in the art that the foregoing and other changes and omissions in the form and detail thereof can be made therein without departing from the spirit and the scope of the invention, which is to be limited and defined only as set forth in the following claims.

Having thus described a typical embodiment of our invention, that which we claim as new and desire to secure by Letters Patent of the United states is:

1. The method of producing laser energy which comprises:

providing free atoms by chemically reacting at least two primary reactants in an exothermic chemical reaction in nonstoichiometric proportions in a high pressure chamber producing a first gas mixture which contains the free atoms;

expanding the first gas mixture from a condition of relatively high pressure and high stagnation temperature in the reaction chamber to a condition of reduced pressure and reduced translational temperature, freezing the free atoms to inhibit recombination of the free atoms;

reacting a second reactant with the free atoms to produce a second gas mixture including an active laser gas and to provide in the laser gas an inverted population of vibrationally excited molecules; and passing the second gas mixture through means for providing stimulated emission of radiation from the active laser gas.

2. The method producing laser energy which comprises:

providing free atoms by chemically reacting at least two primary reactants in an exothermic chemical reaction in nonstoichiometric proportions in a high pressure reaction chamber producing a first gas mixture which contains the free atoms;

expanding the first gas mixture from a condition of relatively high pressure and high stagnation temperature in the reaction chamber to a condition of reduced pressure and reduced translational temperature, freezing the free atoms to inhibit recombination of the free atoms;

reacting a second reactant with the free atoms to produce a second gas mixture including an active laser gas and to provide in the laser gas an inverted population of vibrationally excited molecules;

expanding the second gas mixture; and passing the second gas through means for providing stimulated emission of radiation from the active laser gas.

3. The method of producing laser energy which comprises:

chemically reacting at least two primary reactants in an exothermic chemical reaction in nonstoichiometric proportions in a high pressure reaction chamber, producing reaction products containing free atoms;

injecting a diluent gas into the reaction products to lower the stagnation temperature of the reaction products to minimize the recombination of free atoms, and to form a first gas mixture;

expanding the first gas mixture from a condition of relatively high pressure and high stagnation temperature in the reaction chamber to a condition of reduced pressure and reduced translational temperature, freezing the free atoms to inhibit recombination of the free atoms;

reacting a secondary reactant with the free atoms to form a second gas mixture and to provide an inverted population of vibrationally excited molecules of an active laser gas;

admixing additional amounts of the diluent gas to reduce the translational temperature of the second gas mixture forming a third gas mixture;

expanding the third mixture; and passing the third mixture through means for producing stimulated emission of radiation from the active laser gas.

4. The method according to claim 3 wherein a first of said primary reactants is selected from the group consisting of deuterium, sulfur, carbon disulfide, cyanogen, hydrogen and carbon;

a second of said primary reactants is fluorine;

the secondary reactant is selected from the group consisting of hydrogen and deuterium; and the diluent is selected from the group consisting of helium, argon and nitrogen.

5. The method according to claim 3 wherein a first of said primary reactants is selected from the group consisting of hydrogen, deuterium, hydrazine and ammonia;

a second of said primary reactants is selected from the group consisting of fluorine, chlorine trifluoride and chlorine tetrafluoride;

the secondary reactant is selected from the group consisting of fluorine, sulfur hexafluoride and carbon tetrafluoride; and the diluent is selected from the group consisting of argon and nitrogen.

6. The method according to claim 3 wherein a first of said primary reactants is selected from the group consisting of hydrogen, deuterium, hydrazine and ammonia;

a second of said primary reactants is selected from the group consisting of fluorine, chlorine trifluoride and chlorine pentafluoride;

the secondary reactant is selected from the group consisting of chlorine, bromine and iodine; and the diluent is selected from the group consisting of helium, argon and nitrogen.

7. The method according to claim 3 wherein a first of said primary reactants is hydrogen;

a second of said primary reactants is selected from the group consisting of carbon trifluoride, carbon pentafluoride and a mixture of fluorine and chlorine;

the secondary reactant is selected from the group consisting of hydrogen bromide and hydrogen iodine; and the diluent is selected from the group consisting of helium, argon and hydrogen.

8. The method according to claim 3 wherein a first of said primary reactants is hydrogen;

a second of said primary reactant is selected from the group consisting of bromine trifluoride, bromine pentafluoride and a mixture of fluorine and chlorine;

the secondary reactant is hydrogen iodide; and the diluent is selected from the group consisting of helium, argon and nitrogen.

9. The method of producing laser energy which comprises:

reacting hydrogen and fluorine exothermically in nonstoichiometric proportions in a high pressure reaction chamber, producing reaction products containing free fluorine atoms;

injecting helium as a diluent gas into the reaction chamber to lower the stagnation temperature of the reaction products and minimize the recombination of the free fluorine atoms, forming a first gas mixture;

expanding the first gas mixture to a translational temperature lower than 200°F and a pressure lower than 100 Torr, freezing the free atoms to inhibit recombination of the free atoms;

reacting hydrogen molecules with the free fluorine atoms to form a second gas mixture to provide an inverted population of vibrationally excited molecules of hydrogen fluoride;

admixing additional amounts of helium to reduce the translational temperature of the second gas mixture and forming a third gas mixture;

expanding the third gas mixture; and passing the third gas mixture through means for providing stimulated emission of radiation from the active laser gas.

10. The method of producing laser energy which comprises:

reacting hydrogen and fluorine exothermically with a fluorine-to-hydrogen molar ratio of approximately 1 to 5:1, preferably 3:1 in a reaction chamber, producing a first gas mixture which contains substantially all of the excess fluorine as free fluorine atoms;

expanding the first gas mixture from a stagnation temperature of approximately 3,500°F in the reaction chamber to a condition of approximately 100°F and a pressure of approximately 30 Torr, freezing the free atoms of fluorine to inhibit recombination of the free atoms;

reacting deuterium molecules with the free fluorine atoms to form a second gas mixture and to provide an inverted population of vibrationally excited deuterium fluoride; and passing the second gas mixture through means for providing stimulated emission of radiation from the active laser gas.

11. The method of producing laser energy which comprises:
reacting hydrogen and fluorine exothermically with a fluorine-to-hydrogen molar ratio of approximately 1 to 5:1, preferably about 3:1 in a reaction chamber, producing reaction products which contain substantially all of the excess fluorine as free fluorine atoms;
injecting into the reaction chamber a sufficient amount of sulfur hexafluoride diluent to establish a first gas mixture having a sulfur hexafluoride volume consistency of from 15 to 30 percent;
expanding the first gas mixture from a stagnation temperature of approximately 3,500°F in the reaction chamber to a condition of approximately 100°F and a pressure of approximately 30 Torr, freezing the free atoms of fluorine to inhibit recombination of the free atoms;
reacting deuterium molecules with the free fluorine atoms to form a second gas mixture and to provide an inverted population of vibrationally excited deuterium fluoride;
admixing additional amounts of sulfur hexafluoride to reduce the translational temperature of the second gas mixture to approximately 100°F forming a third gas mixture;
expanding the third gas mixture to a pressure of less than 100 Torr; and
passing the third gas mixture through means for providing stimulated emission of radiation from the active laser gas.

12. The method of producing laser energy which comprises:
reacting hydrogen and fluorine exothermically with a fluorine-to-hydrogen molar ratio of approximately 1 to 5:1, preferably 3:1 in a reaction chamber, producing reaction products which contain substantially all of the excess fluorine as free fluorine atoms;
injecting into the reaction chamber a sufficient amounts of helium diluent gas to establish a first gas mixture having a helium volume consistency of about 30 to 60 percent;
expanding the first gas mixture from a stagnation temperature of approximately 3,500°F in the reaction chamber to a condition of approximately 100°F and a pressure of approximately 30 Torr, freezing the free atoms of fluorine to inhibit recombination of the free atoms;
reacting deuterium molecules with the free fluorine atoms to form a second gas mixture and to provide an inverted population of vibrationally excited deuterium fluoride;
admixing additional amounts of helium to reduce the translational temperature of the second gas mixture to approximately 100°F forming a third gas mixture;
expanding the third gas mixture to a pressure of less than 100 Torr; and
passing the third gas mixture through means for providing stimulated emission of radiation from the active laser gas.

13. The method of producing laser energy which comprises:
reacting deuterium and fluorine exothermically with a fluorine-to-deuterium molar ratio of approximately 1 to 5:1, preferably about 3:1 in a reaction chamber producing a first gas mixture which contain substantially all of the excess fluorine as free fluorine atoms;
expanding the first gas mixture from a stagnation temperature of approximately 3,500°F in the reaction chamber to a condition of approximately 10°F and a pressure of approximately 30 Torr, freezing the free atoms of fluorine to inhibit recombination of the free atoms;
reacting hydrogen molecules with the free fluorine atoms to form a second gas mixture and to provide an inverted population of vibrationally excited hydrogen fluoride; and
passing the second gas mixture through means for providing stimulated emission of radiation from the active laser gas.

14. The method of producing laser energy which comprises:
reacting deuterium and fluorine exothermically with a fluorine-to-deuterium molar ratio of approximately 1 to 5:1, preferably about 3:1 in a reaction chamber, producing reaction products which contain substantially all of the excess fluorine as free fluorine atoms;
injecting into the reaction chamber a sufficient amount of sulfur hexafluoride diluent to establish a first gas mixture having a sulfur hexafluoride volume consistency of from 15 to 30 percent;
expanding the first gas mixture from a stagnation temperature of approximately 3,500°F in the reaction chamber to a condition of approximately 100°F and a pressure of approximately 30 Torr, freezing the free atoms of fluorine; to inhibit recombination of the free atoms;
reacting hydrogen molecules with the free fluorine atoms to form a second gas mixture and to provide an inverted population of vibrationally excited hydrogen fluoride;
admixing additional amounts of sulfur hexafluoride to reduce the translational temperature of the second gas mixture to approximately 100°F forming a third gas mixture;
expanding the third gas mixture to a pressure of less than 100 Torr; and
passing the third gas mixture through means for providing stimulated emission of radiation from the active laser gas.

15. The method of producing laser energy which comprises:
reacting deuterium and fluorine exothermically with a fluorine-to-deuterium molar ratio of approximately 1 to 5:1, preferably about 3:1 in a reaction chamber, producing reaction products which contain substantially all of the excess fluorine as free fluorine atoms;
injecting into the reaction chamber a sufficient amount of helium diluent to establish a first gas mixture having a helium volume consistency of from 30 to 60 percent;
expanding the first gas mixture in the reaction chamber from a stagnation temperature of approximately 3,500°F to a condition of approximately 100°F and a pressure of approximately 30 Torr, freezing the free atoms of fluorine to inhibit recombination of the free atoms;

reacting hydrogen molecules with a free fluorine atoms to form a second gas mixture and to provide an inverted population of vibrationally excited hydrogen fluoride;

admixing additional amounts of helium to reduce the temperature of the second gas mixture to approximately 100°F forming a third gas mixture;

expanding the third gas mixture to a pressure of less than 100 Torr; and passing the third gas mixture means for providing stimulated emission of radiation from the active laser gas.

16. The method of producing laser energy which comprises:

reacting hydrogen and fluorine exothermically with a fluorine-to-hydrogen molar ratio of approximately 0.6 to 0.2:1, preferably about 0.5:1, in a reaction chamber producing a first gas mixture which contains free hydrogen atoms;

expanding the first gas mixture from a stagnation temperature of approximately 4,000°F in a reaction chamber to a condition of approximately 100°F and a pressure of approximately 30 Torr, freezing the free hydrogen atoms to inhibit recombination of the free atoms;

reacting additional fluorine containing molecules with the free hydrogen atoms to form a second gas mixture and to provide an inverted population of vibrationally excited hydrogen fluoride; and passing the second gas mixture through means for providing stimulated emission of radiation from the active laser gas.

17. The method according to claim 3 wherein a first of said primary reactants is selected from the group consisting of cyanogen, lithium, carbon disulfide and carbon;

a second of said primary reactants is selected from the group consisting of oxygen, ozone and oxygen difluoride;

the secondary reactant is selected from the group consisting of carbon disulfide and carbon suboxide; and the diluent is selected from the group consisting of helium argon and nitrogen.

18. The method of producing laser energy which comprises:

reacting cyanogen with ozone exothermically in a molar ratio of approximately 1:1.5 in a high pressure reaction chamber producing a first gas mixture containing free oxygen atoms;

expanding the first gas mixture from a condition of relatively high pressure and stagnation temperature in the reaction chamber to a condition of reduced pressure and translational temperature, freezing the free oxygen atoms to inhibit recombination of the free atoms;

reacting a secondary reactant selected from the group consisting of carbon disulfide and carbon suboxide with the free oxygen atoms to form a second gas mixture and to produce an inverted population of vibrationally excited molecules of carbon monoxide; and passing the second gas mixture through means for providing stimulated emission of radiation from the active laser gas.

19. The method of producing laser energy which comprises:

reacting lithium and oxygen difluoride exothermically in a molar ratio of approximately 0.55:1 in a high pressure reaction chamber producing a first gas mixture containing free oxygen atoms;

expanding the first gas mixture from a condition of relatively high pressure and stagnation temperature in the reaction chamber to a condition of reduced pressure and temperature, freezing the free oxygen atoms to inhibit recombination of the free atoms;

reacting a secondary reactant selected from the group consisting of carbon disulfide and carbon suboxide with the free oxygen atoms to form a second gas mixture to provide an inverted population of vibrationally excited molecules of carbon monoxide; and passing the second gas mixture through means for providing stimulated emission of radiation from the active laser gas.

20. The method of producing laser energy which comprises:

reacting hydrogen and fluorine exothermically in a molar ratio of approximately 1.4:1 in a high pressure reaction chamber producing reaction products containing free hydrogen atoms;

injecting helium diluent gas into the reaction chamber to lower the stagnation temperature of the reaction products and minimize the recombination of the free hydrogen atoms;

expanding the gases from a condition of relatively high pressure and stagnation temperature in the reaction chamber to a condition of reduced translational temperature and pressure, freezing the free hydrogen atoms to inhibit recombination of the free atoms;

reacting ozone of the free hydrogen to form a first gas mixture and to produce an inverted population of vibrationally excited hydroxyl radical molecules;

admixing additional amounts of helium diluent to reduce the translational temperature of the first gas mixture and forming a second gas mixture;

expanding the second gas mixture; and passing the second gas mixture through means for providing stimulated emission of radiation from the active laser gas.

* * * * *

UNITED STATES PATENT OFFICE
CERTIFICATE OF CORRECTION

Patent No. 3,701,045  Dated October 24, 1972

Inventor(s) BARRY R. BRONFIN ET AL

It is certified that error appears in the above-identified patent and that said Letters Patent are hereby corrected as shown below:

Column 1, line 10, change "lasers" to "laser".

Column 6, line 44, delete "products".

Column 8, in the chart at the line beginning with "$C_2N_2$", change "$P_2$" to "$O_2$"; line 34, after "pressure" insert -- reaction --; line 50, after "method" insert -- of --.

Column 9, line 1, after "gas" insert -- mixture --.

Column 11, line 43, change "amounts" to "amount".

Column 12, line 9, change "10°F" to "100°F".

Signed and sealed this 13th day of March 1973.

(SEAL)
Attest:

EDWARD M. FLETCHER, JR.  ROBERT GOTTSCHALK
Attesting Officer  Commissioner of Patents